(12) United States Patent
Wilsher et al.

(10) Patent No.: US 8,766,545 B2
(45) Date of Patent: Jul. 1, 2014

(54) SELECTIVE STREET LIGHT CONTROL APPARATUS, SYSTEMS, AND METHODS

(75) Inventors: Michael John Wilsher, Letchworth (GB); Brian Reid, Welwyn Garden (GB)

(73) Assignee: Xerox Corporation, Norwalk, CT (US)

( * ) Notice: Subject to any disclaimer, the term of this patent is extended or adjusted under 35 U.S.C. 154(b) by 265 days.

(21) Appl. No.: 13/451,301

(22) Filed: Apr. 19, 2012

(65) Prior Publication Data

US 2013/0278146 A1  Oct. 24, 2013

(51) Int. Cl.
*H05B 37/02* (2006.01)
(52) U.S. Cl.
CPC ............ *H05B 37/02* (2013.01); *H05B 37/0227* (2013.01)
USPC .......................................... 315/153; 315/151
(58) Field of Classification Search
CPC ............................ H05B 37/02; H05B 37/0227
USPC .................................................. 315/151–153
See application file for complete search history.

(56) References Cited

U.S. PATENT DOCUMENTS

| 2010/0029268 | A1  |   2/2010 | Myer et al. |
| 2012/0273663 | A1* | 11/2012 | Young ............................ 250/216 |
| 2013/0257284 | A1* | 10/2013 | VanWagoner et al. ......... 315/131 |
| 2013/0293117 | A1* | 11/2013 | Verfuerth ....................... 315/153 |
| 2013/0293877 | A1* | 11/2013 | Ramer et al. ................... 356/213 |
| 2014/0001961 | A1* |  1/2014 | Anderson et al. ............. 315/153 |

* cited by examiner

*Primary Examiner* — Don Le
(74) *Attorney, Agent, or Firm* — Ronald E. Prass, Jr.; Prass LLP

(57) ABSTRACT

A selective street light control system includes a module having a lamp and being configured to receive a light sensor connected to a street light. The module may be configured to cause the lamp to illuminate to modulate the light sensor. The street light may be controlled based on the light sensor, and the when the light sensor is modulated by the lamp of the module, the street light is also controlled by the module. The module is a self-contained unit and that may advantageously be easily and cost effectively retrofitted to an existing installation without the need for expensive re-wiring of the existing installation.

24 Claims, 3 Drawing Sheets

SELECTIVE STREET LIGHT CONTROL APPARATUS, SYSTEMS, AND METHODS

FIELD OF DISCLOSURE

The disclosure relates to street light control management. In particular, the disclosure relates to selective street light control enabling energy management.

BACKGROUND

Street lights are used to illuminate streets and adjacent areas to enhance safety for drivers and pedestrians. To reduce energy consumption, street lights are turned off in the early hours of the morning, for example. Typically, street lights are controlled per section. For example, an entire street of street lights may all be controlled by a single timer. The street lights and single timer may be configured so that the street lights are turned off during the day, for example, and are turned on during the night. Additionally, or in the alternative, the street lights may be configured to include a light sensor that causes the street lights to turn on only if it is dark. Such street lights may be configured to be turned off at times during which it is dark to conserve energy. For example, a street light or section of street lights may be caused to turn on by a central timer. In daylight, the street light or section of street lights may be held off based on feedback from attached light sensor(s), even if the timer is demanding them to be on. The street lights maybe timer-controlled to turn off despite light sensor feedback at select times. The select times may be times during which vehicle and/or pedestrian traffic is low.

SUMMARY

Because conventional street light control is typically limited and typically configured to enable or disable entire sections of street lights, there is a need for selective street light control to enhance safety cost effectively in existing installations. Apparatus, systems, and methods are provided that accommodate selective street light control enabling enhanced energy management. Apparatus and systems include a control module that is a self-contained unit and that may advantageously be easily and cost effectively retrofitted to an existing installation without the need for expensive re-wiring of the existing installation.

In an embodiment of apparatus, a module useful for selective street light control may include a housing containing a first lamp, the housing being configured to receive a light sensor connected to a street light, the first lamp being configured to modulate the light sensor. Apparatus may include the first lamp being a high power light emitting diode (LED) or other illumination device. Apparatus may include a solar cell connected to the module, the solar cell being configured to receive and convert sunlight into energy usable by the module. Apparatus may include the first lamp being arranged to expose light sensor to light when the first lamp is on to modulate the light sensor. In an embodiment, apparatus may include a light sensor connected to the module, the light sensor being configured to detect light.

In an embodiment, apparatus may include a controller, the controller being connected to the first lamp. The controller may be configured to turn on or off the first lamp at one of a predetermined time, expiration of a predetermined time period, and in response to a signal from at least one of a motion sensor and a light sensor. Apparatus may include a wireless transceiver connected to the controller, the wireless transceiver being configured to transmit and receive a signal for control or programming of the controller. Controller may be programmable based on instructions received from a remote communication device. The remote communication device may be configured to communicate with the controller through the wireless transceiver.

In an embodiment of systems, a selective street light control system useful for energy management may include a street light having a light sensor, the street light being configured to cause the street light to turn off when the street light sensor detects light; and a street light control module, the module comprising a housing contained first lamp, the housing being configured to receive the light sensor connected to the street light. Systems may include the first lamp being a high power LED or other illumination device. Systems may include a solar cell connected to the module, the solar cell being configured to receive and convert sunlight into energy for use by the module. Systems may include the first lamp being arranged to expose the light sensor to light when the first lamp is on to modulate the light sensor. Systems may include a light sensor connected to the module, the light sensor being configured to detect light. The light sensor connected to the module may be a second light sensor that is arranged on an exterior of the module.

Systems may include a controller, the controller being connected to the first lamp. In an embodiment of systems, the controller may be configured to turn on or off the first lamp at one of a predetermined time, expiration of a predetermined time period, and in response to a signal from at least one of a motion sensor and a light sensor. Systems may include a wireless transceiver connected to the controller, the wireless transceiver being configured to transmit and receive a signal for control or programming of the controller. Systems may include the controller being programmable based on instructions received from a remote communication device, the remote communication device being configured to communicate with the controller through the wireless transceiver. Systems may include a remote communication device for communicating with the controller using the wireless communicator.

In an embodiment, methods may include containing a lamp in a housing configured for receiving a light sensor connected to a street lamp, the lamp being connected to a controller configured for controlling the lamp. Methods may include fitting the housing onto a street lamp having a light sensor, the light sensor being inserted into the housing. In an embodiment, methods may include programming the controller of the module. The module may be controlled using a remote communication device wherein the programming includes transmitting a signal from the remote communication device, the signal being received by a wireless transceiver connected to the module, the wireless transceiver being configured to transmit data to the controller based on the received signal. Such a wireless transceiver and controller may be configured to communicate with other street lights in the vicinity, for example, allowing enhanced functions such as data sharing and area control or feed forward motion detection, wherein when motion is detected by one light or lights, the next light or surrounding lights are activated improving the user experience and security.

Exemplary embodiments are described herein. It is envisioned, however, that any system that incorporates features of apparatus, systems, and methods described herein are encompassed by the scope and spirit of the exemplary embodiments.

DETAILED DESCRIPTION

Figure 1A:
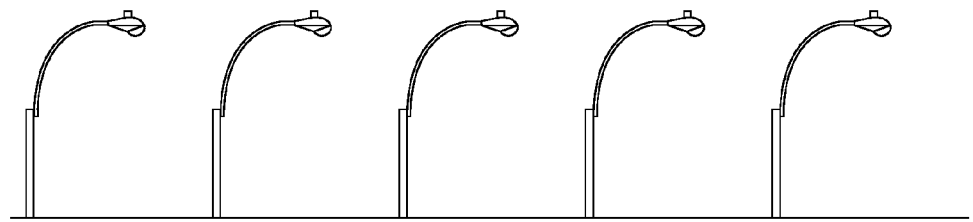
FIG. 1A shows a diagrammatical view of a section of street lights configured for related art street light control.

Exemplary embodiments are intended to cover all alternatives, modifications, and equivalents as may be included within the spirit and scope of the apparatus, systems, and methods as described herein.

Reference is made to the drawings to accommodate understanding of apparatus, systems, and methods for selective street light control. In the drawings, like reference numerals are used throughout to designate similar or identical elements. The drawings depict various embodiments and data related to embodiments of illustrative apparatus, systems, and methods for selective street light control.

Apparatus and systems may include a module that is constructed to be arranged or fitted on a street light. A module may include some or all components such as those described herein as desired for a particular application. For example, the module may be solar powered, and may include a solar cell. The module may include an external light sensor. The module may include a controller that may be pre-set or programmed as desired. The module may be configured to be fitted to a street light having a street light sensor attached to the street light and configured for detecting light. The street light may be actuated based on whether light is detected by the light sensor. Apparatus and systems include a control module that is a self-contained unit and that may advantageously be easily and cost effectively retrofitted to an existing installation without the need for expensive re-wiring of the existing installation.

FIG. 1A shows a diagrammatical view of a street light section using related art street light control. The section of street lights shown in FIG. 1A are controlled by a timer or a light sensor. For example, this section of street lights may be controlled to turn off during daylight hours, and to turn on during nighttime hours and/or during periods of darkness. Alternatively, or in combination, street lights of the street light section shown in FIG. 1A may be configured with a light sensor that causes the street lights to turn off when the light sensor detects light. FIG. 1A shows the street light section with the lamps off.

Figure 1B:
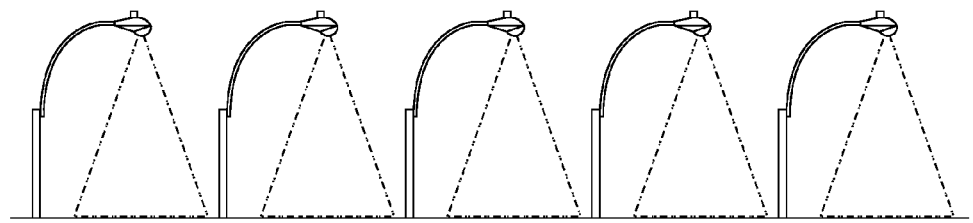
FIG. 1B shows a diagrammatical view of a section of street lights configured for related art street light control.

FIG. 1B shows a section of street lights with the street lights on. Street lights in the section shown in FIG. 1B may be on based on a timer control configured to turn the lights on at nighttime, for example. Alternatively, the street lights shown in FIG. 1B maybe on as a result of a detection state of a light sensor mounted to the street lights. Whether the street light section shown in FIG. 1A and FIG. 1B are controlled by one or a combination of a timer or a series of light sensors, the street lights are controlled by section rather than individually.

Figure 2:
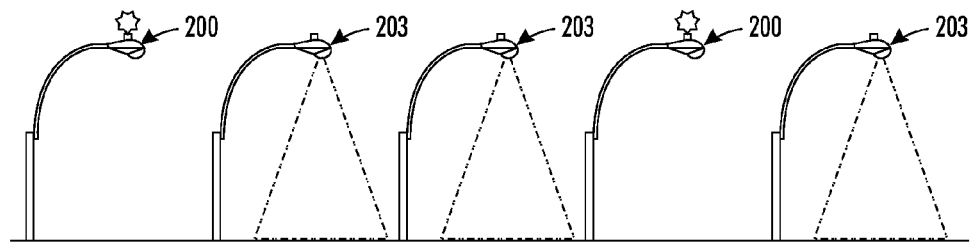
FIG. 2 shows a diagrammatical view of a section of street lights configured for street control in accordance with an exemplary embodiment.

FIG. 2 shows a section of street lights in accordance with an exemplary embodiment of apparatus and systems. FIG. 2 shows collectively controlled street lights 200. The selectively controlled street lights 200 include a module in accordance with apparatus of embodiments. Street lights 203 are not fitted with the module. The section of street lights comprising lights 200 and lights 203 are controlled by a timer and/or a light sensor. Street lights 203 shown in FIG. 2 are in an on state based on one or both of a connected timer or light sensor. The module connected to the street lights 200 causes the street lights 200 to be in an off state, although, the lights 200 are also connected to the timer control, and/or also include a light sensor. The module connected to the street lights 200 is configured to turn the street lights 200 off as desired. The entire section of street lights 200 and 203 shown in FIG. 2 may be controlled by a single timer, but individual street lights 200 maybe turned off using the module attached to the street lights 200. As such, all street lights in a section, or merely just select street lights, may be outfitted with a module, and may accordingly be individually and/or selectively controlled.

Figure 3:
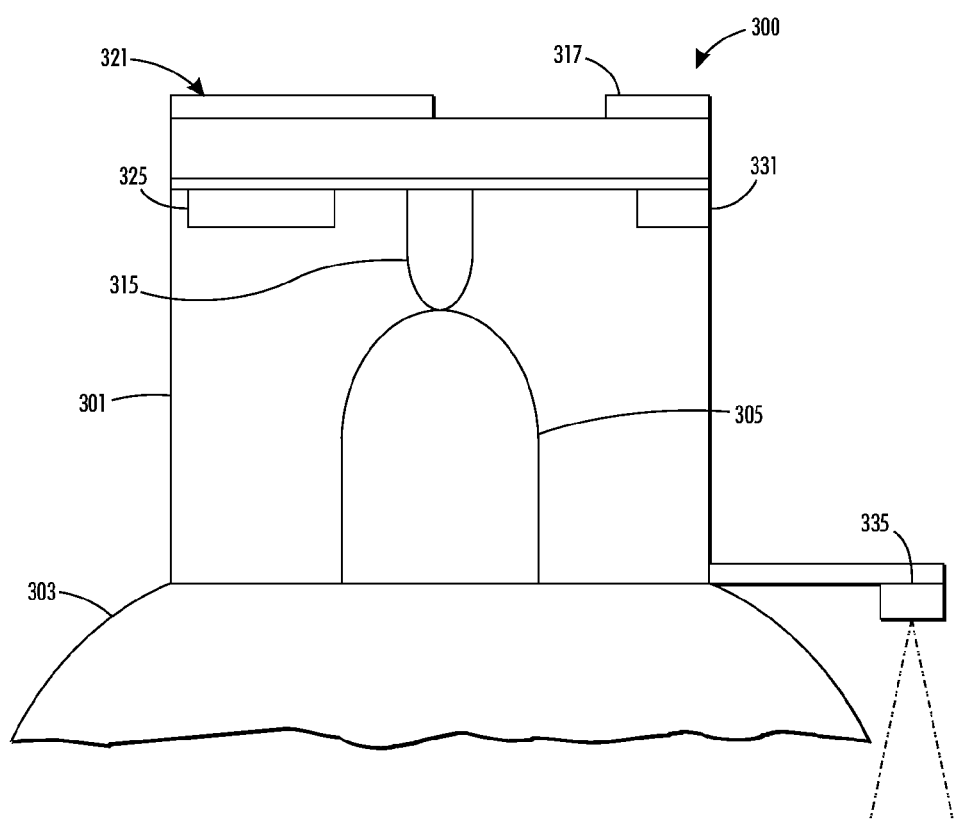
FIG. 3 shows street light control methods in accordance with an exemplary embodiment.

FIG. 3 shows apparatus and systems in accordance with an exemplary embodiment; in particular, FIG. 3 shows a selective street light control system 300. The system 300 includes a selective control module 301. The module 301 includes a housing. The housing maybe configured to define a cavity for receiving a light sensor 305 that is connected to a street light street. Accordingly, the housing 301 may be fitted onto a street light by receiving a light sensor 305, and covering the light sensor 305 so that the light sensor 305 is not exposed to light from an exterior of the housing 301. The street light sensor 305 may be attached to a street light 303, and may be configured to cause the street light to be in an on state when the light sensor 305 detects light.

The housing of the module 301 may contain a lamp 315. The lamp 315 may be a light emitting diode, such as a high powered light emitting diode or other illumination device. The lamp 315 may be disposed and configured to cause the light sensor 305 to detect light when the lamp 315 is on. For example, the lamp 315 may be positioned immediately above the light sensor 305 of the street light 303. Thus, when the lamp 315 is on, the street light 303 may be caused to be on based on detection of light emitted by the lamp 315 by the light sensor 305.

The housing 301 may include an external light sensor 317. The light sensor 317 may be configured to detect light such as sunlight. The module may be configured to cause the lamp 315 to be off when the light sensor 317 does not detect light. Accordingly, the street light 303 may be caused to turn off when the light sensor 317 does not detect light, whereby, the lamp 315 is actuated to be on, thereby causing the light sensor 305 to detect light.

A module in accordance with apparatus and systems may include a solar cell 321. The solar cell 321 may be configured to convert solar power into energy usable by the module for powering, for example, the lamp 315, and/or a controller 325. The housing 301 may contain a controller 325. The controller may include a processor, a timer chip, and/or may be connected to a storage module. The controller may be configured to cause the lamp 315 to turn on at a predetermined time, or to turn off at a predetermined time. The controller may be configured to turn on and/or off the lamp 315 in accordance with a pre-programmed set of computer readable instructions, for example. Such instructions may be stored in a storage module such as computer-readable memory. The computer readable instructions may be updated and/or re-programmed after installation of the module 301 including the housing to a street light 303.

The housing of the module 301 may contain or may support one or more wireless transceivers 331 or wireless module(s) containing transceiver(s). Wireless transceiver 331 may be configured for Bluetooth WiFi communication or other wireless communication, for example, for control and/or programming of the module from an external and/or remote source. A remote communication device such as a handheld device containing a transceiver, or a remote control station, may be used to communicate with the controller 325 or a control system containing the controller 325 of the module. The remote communication device may communicate by way of the wireless transceiver 331. The wireless transceiver 331 may receive signals from a remote communication device or external device, and may facilitate communication of information by way of the received signal to the controller 325 and/or an associated storage module. Wireless communication between street lights may be implemented for feed forward or area control of lighting. For example, the transceiver 331 and the controller 325 may be configured to communicate with other street lights in the vicinity, for example, allowing enhanced functions such as data sharing and area control or feed forward motion detection, wherein when motion is detected by one light or lights, a next light or surrounding lights are activated improving the user experience and security.

A motion detector 335 may be attached to the housing of the module 301. The motion detector 335 may be configured to detect motion in an area near the street light 303 having the housing 301 connected thereto. The controller 325 may be arranged and configured to turn off the lamp 315 thereby causing the light sensor 305 to detect no light. Street light 303 having the housing 301 attached thereto may be caused to turn on when the light sensor 305 does not detect light. The controller 325 of the module may be configured with the motion detector 335 to cause the street light 303 to turn on, for example, only when there is movement in an area adjacent to the street light 303. The module may be configured to turn the street light 303 off after a period of inactivity.

Figure 4:
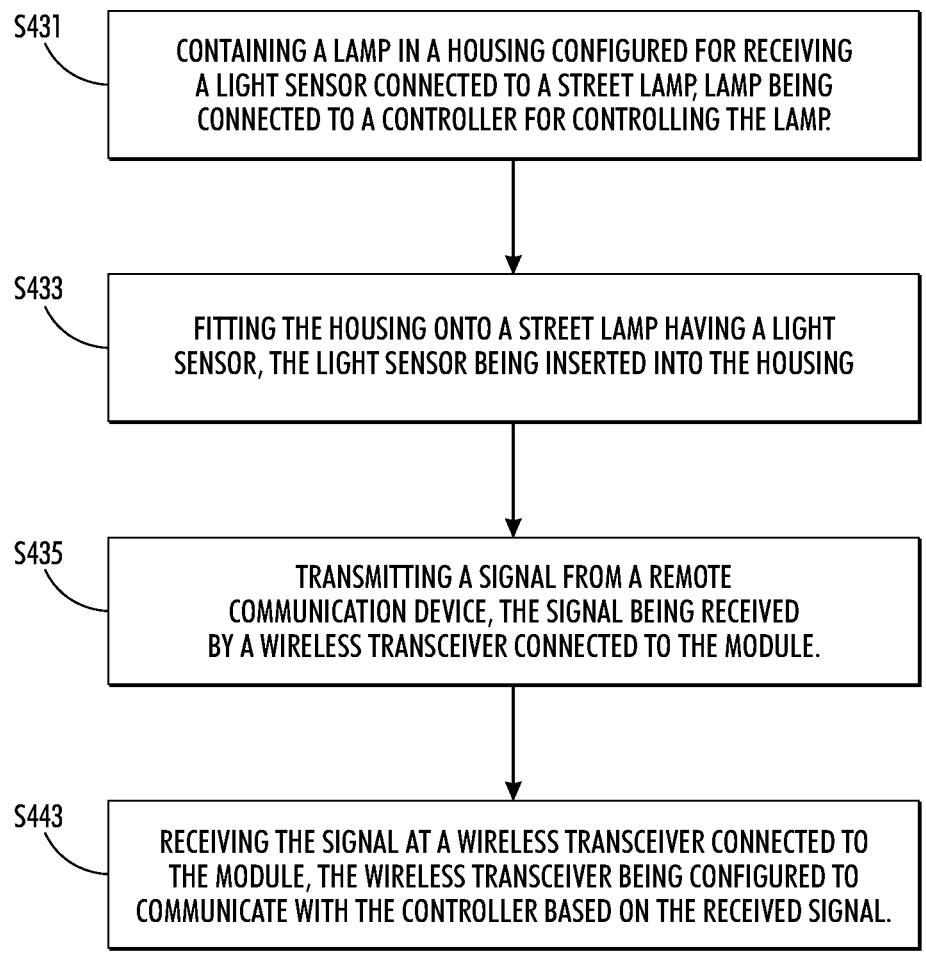
FIG. 4 shows selective street light control methods in accordance with an exemplary embodiment.

Methods for selective street light control are shown in FIG. 4. Methods may include constructing a selective street light control module by containing a lamp in a housing configured for receiving a light sensor that is connected to a street lamp. The lamp contained within the housing may be a high power LED or other illumination device, for example. The light sensor connected to the street light may be configured to enable the street light to turn on or off depending on whether the light sensor detects light. Methods may include containing the lamp in the housing as shown at S431.

Methods may include fitting the housing onto a street lamp having a light sensor, the light sensor being inserted into the housing. In particular, the module may include a housing constructed to define a receptacle for receiving the light sensor connected to the street light. The housing may be fit over the light sensor of a street light at S433.

Methods may include transmitting a signal for a remote communication device to update or program a module at S435. In particular, a module may be programmed by transmitting a signal for a remote communication device that is received by a wireless transceiver that is connected to the module. The wireless transceiver may be configured for blue tooth functionality, for example, for communicating with a blue tooth enabled remote communication device. The signal may be received at the wireless transceiver at S443. A controller may be caused to control the module in accordance with a signal received by the wireless transceiver. The module may be controlled by a controller that acts on computer readable instructions. The computer readable instructions may be received from a remote communication device and/or stored in a connected storage module. One or more street lamps of a street lamp section may be fitted with a module in accordance with apparatus, systems, and methods.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art.

What is claimed is:

1. A module useful for selective street light control, comprising:
   a housing containing a first lamp, the housing being configured to receive a light sensor connected to a street light, the first lamp being configured to modulate the light sensor.

2. The module of claim 1, comprising the first lamp being a high power light emitting diode or other illumination device.

3. The module of claim 1, comprising:
   a solar cell connected to the module, the solar cell being configured to receive and convert sunlight into energy usable by the module.

4. The module of claim 1, comprising the first lamp being arranged to expose the light sensor to light when the first lamp is on to modulate the light sensor.

5. The module of claim 1, comprising:
   a light sensor connected to the module, the light sensor being configured to detect light.

6. The module of claim 1, comprising:
   a controller, the controller being connected to the first lamp.

7. The module of claim 6, the controller being configured to turn on or off the first lamp at one of a predetermined time, expiration of a predetermined time period, and in response to a signal from at least one of a motion sensor and a light sensor.

8. The module of claim 6, comprising:
   a wireless transceiver connected to the controller, the wireless transceiver being configured to transmit and receive a signal for control or programming of the controller.

9. The module of claim 8, comprising the controller being programmable based on instructions received from a remote communication device, the remote communication device being configured to communicate with the controller through wireless transceiver.

10. The module of claim 6, comprising:
    a wireless transceiver, the wireless transceiver being configured to communicate with adjacent or remote street light modules.

11. The module of claim 7, comprising:
    a wireless transceiver module, the wireless transceiver module and the controller being configured to communicate with at least one other street light module, whereby when the motion sensor detects motion, the at least one other street light is caused to turn on.

12. The module of claim 1, the module being configured for retrofitting a pre-installed street light having a light sensor.

13. A selective street light control system useful for energy management, the system comprising:
    a street light having a light sensor, the street light being configured to cause the street light to turn off when the light sensor detects light; and
    a street light control module, the module comprising a housing containing a first lamp, the housing being configured to receive the light sensor connected to the street light.

14. The system of claim 13, comprising the first lamp being a high power light emitting diode or other illumination device.

15. The system of claim 13, comprising:
    a solar cell connected to the module, the solar cell being configured to receive and convert sunlight into energy usable by the module.

16. The system of claim 13, comprising the first lamp being arranged to expose the light sensor to light when the first lamp is on to modulate the light sensor.

17. The system of claim 13, comprising:
a second light sensor connected to the module, the second light sensor being configured to detect light.

18. The system of claim 13, comprising:
a controller, the controller being connected to the first lamp.

19. The system of claim 18, the controller being configured to turn on or off the first lamp at one of a predetermined time, expiration of a predetermined time period, and in response to a signal from at least one of a motion sensor and a light sensor.

20. The system of claim 18, comprising:
a wireless transceiver connected to the controller, the wireless transceiver being configured to transmit and receive a signal for control or programming of the controller, or feeding forward motion sensor data to at least one other module in a wireless module network.

21. The system of claim 20, comprising the controller being programmable based on instructions received from a remote communication device, the remote communication device being configured to communicate with the controller through the wireless transceiver.

22. The system of claim 20, comprising:
a remote communication device for communicating with the controller using the wireless communication device.

23. A street light control method, comprising:
containing a lamp in a housing configured for receiving a light sensor connected to a street lamp, the lamp being connected to a controller for controlling the lamp; and
fitting the housing onto a street lamp having a light sensor, the light sensor being inserted into the housing.

24. The method of claim 23, comprising:
transmitting or receiving programming or motion sensor data using a wireless module connected to the housing, the wireless module being configured for communicating data for programming the controller of the module using a remote communication device wherein the programming includes transmitting a signal from the remote communication device, the signal being received by a wireless transceiver connected to the module, the wireless transceiver being configured to transmit data to the controller based on the received signal, and for communicating motion sensor data from an attached motion sensor or a remote motion sensor attached to a wirelessly networked remote housing.

* * * * *